Patented May 24, 1932

1,859,801

UNITED STATES PATENT OFFICE

WINFIELD SCOTT, OF NITRO, WEST VIRGINIA, ASSIGNOR TO THE RUBBER SERVICE LABORATORIES CO., OF AKRON, OHIO, A CORPORATION OF OHIO

AGE RESISTING VULCANIZED RUBBER COMPOUND

No Drawing.   Application filed December 6, 1929.   Serial No. 412,284.

The present invention relates to processes for manufacturing vulcanized rubber and to products obtained thereby. It is more particularly directed to processes for vulcanizing rubber wherein there is incorporated into a rubber mix of vulcanization characteristics, a compound of the type hereinafter disclosed whereby anti-oxidant or age resisting properties are developed in the vulcanized rubber product. The invention will be understood from the following description and examples of a preferred mode of operating the process wherein the invention is fully set forth and described.

It is well known to rubber chemists that rubber compounds cured in the presence of vulcanization accelerators such as aldehyde derivatives of Schiff's bases deteriorate much less readily in storage or in service than do similar rubber products cured in the presence of certain other accelerators such, for example, as diphenyl-guanidine. Other compounds that otherwise would be effective accelerators of the rubber vulcanization process cannot be employed to good advantage commercially since the presence of such compounds, or of their heat of decomposition or sulfur or other reaction products produced in the rubber curing process, apparently cause or aid in causing a relatively rapid deterioration of the vulcanized products. Such rubber products are said to age badly, that is, the rubber becomes hard and loses a large part of its resiliency, while other characteristics such as tensile strength and the like are very detrimentally affected.

The age resisting characteristics of a vulcanized rubber product can be readily ascertained by subjecting samples of the vulcanized product in a bomb to the action of oxygen under pressure and maintained for several hours at an elevated temperature. The treated samples are then examined and tested and the results compared with similar results obtained by testing the unaged vulcanized stock. The deterioration in properties suffered as a result of the oxidation treatment is indicative of the result that would normally be expected from that particular stock during service. Such a test is known as the Bierer-Davis aging test and produces an effect on a vulcanized rubber stock comparable with that resulting from several years of natural aging of the rubber.

According to the present invention, a new class of anti-oxidants has been found which, upon incorporation into a rubber stock, imparts such desirable age resisting qualities to the vulcanized stock that samples thereof, when subjected to the artificial aging tests described, undergo only a relatively small loss in tensile strength. The compounds herein disclosed as imparting such desirable anti-oxidant characteristics to vulcanized rubber, comprise the reaction product of a Schiff's base and an aryl hydroxide.

One of the preferred class of compounds, for example the reaction product of croton aldehyde aniline and beta naphthol was prepared in the following manner. Substantially one-half a molar portion (35 parts) of croton aldehyde was added to substantially one-half a molar portion (46.5 parts) of aniline at room temperature. The product was allowed to stand preferably at room temperature from approximately one to two hours and then substantially one-half a molar portion (72 parts) of beta naphthol and substantially one part of a catalyst or condensing agent, for example iodine, added thereto and the mixture heated for approximately four hours at a temperature of substantially 180 to 200° C. to complete the reaction. The resulting product was incorporated in the well known manner in a rubber stock comprising 100 parts of pale crepe rubber, 5 parts of zinc oxide, 3.5 parts of sulfur, .75 part of diphenyl guanidine, 2.0 parts of the reaction product of croton aldehyde-aniline and beta naphthol.

The rubber stock thus formed was then cured by heating sheets of the stock in the usual manner for 45 minutes in a press maintained at the temperature given by forty pounds of steam pressure per square inch (that is 287° F.). Portions of the stock cured as set forth were then artificially aged by heating samples of the stock in an oxygen bomb for 18 hours at a temperature of 75° C. and under a pressure of 300 pounds of oxygen per square inch. The results obtained upon testing the aged and unaged stocks are as follows:

Table I

| Time of cure | Hours aged | Modulus of elasticity in lbs./in.² at elongation of | | | Tensile at break in lbs./in.² | Ultimate elongation % |
|---|---|---|---|---|---|---|
| | | 300% | 500% | 700% | | |
| 45 min. at 287° F | 0 | 311 | 1,110 | 3,865 | 3,980 | 705 |
| 45 min. at 287° F | 18 | 384 | 1,305 | | 3,440 | 670 |

The data set forth in Table I shows conclusively that the product prepared by reacting substantially equi-molecular proportions of beta naphthol and a Schiff's base prepared from croton aldehyde and aniline imparts very desirable anti-oxidant properties to a rubber stock of vulcanization characteristics.

Another of the preferred class of compounds was prepared by heating substantially one molar portion of anhydro formaldehyde para toluidine (119 parts) and substantially one molar portion of phenol (94 parts) at approximately 100 to 120° C. for substantially five hours. The reaction product thus formed was washed first with a weak alkaline solution for example a 5% aqueous sodium hydroxide solution to eliminate any unreacted phenol and then with water to eliminate occluded caustic solution. The product thus obtained was incorporated in a rubber mix comprising 100 parts of pale crepe rubber, 5 parts of zinc oxide, 3.5 parts of sulfur, .8 part of diphenyl-guanidine 2.0 parts of anti-oxidant.

Samples of the rubber stock thus formed were then cured by heating sheets of the stock in the usual manner for 45 minutes in a press maintained at the temperature given by forty pounds of steam pressure per square inch. Portions of the stock thus cured were then artificially aged by heating samples of the vulcanized product in an oxygen bomb for 18 hours at a temperature of 75° C. and under a pressure of 400 pounds of oxygen per square inch. The data showing a comparison between the aged and unaged stock is given in Table II.

Table II

| Time of cure | Hours aged | Modulus of elasticity in lbs./in.² at elongation of | | | Tensile at break in lbs./in.² | Ultimate elongation % |
|---|---|---|---|---|---|---|
| | | 300% | 500% | 700% | | |
| 45 min. at 287° F | 0 | 161 | 349 | 1,240 | 2,693 | 840 |
| 45 min. at 287° F | 18 | 145 | 347 | 1,240 | 2,303 | 810 |

It is thus seen that the reaction product of phenol and anhydro formaldehyde para toluidine is a further example of a class of desirable anti-oxidants since the stock showed comparatively little deterioration after being subjected to the severe oxidation test.

Another example of the preferred class of compounds comprises the reaction product formed from substantially equi-molecular proportions of benzylidene-aniline and beta naphthol. Thus, to substantially one-tenth a molar portion of benzylidene-aniline (18.2 parts) dissolved in approximately 40 parts of an organic solvent for example ethyl alcohol, approximately one-tenth a molar portion of beta naphthol (14.4 parts) dissolved in approximately 40 parts of an organic solvent, for example ethyl alcohol, was added, after which agitation was continued for substantially six hours at room temperature. On allowing the product thus formed to stand at room temperature for a period of time, as for example ten to fifteen hours, a hard resinous product was formed. On recrystallizing the resin thus produced from an organic solvent for example ethyl alcohol, a white crystalline product was obtained, a sample of which was incorporated in a rubber mix comprising 100 parts of pale crepe rubber, 5 parts of zinc oxide, 3.5 parts of sulfur, .8 part of diphenyl guanidine, 1.0 parts of the reaction product of beta naphthol and benzylidene aniline.

The rubber stock thus formed was then vulcanized by heating in a press in the usual manner, and samples of the vulcanized product were then artificially aged by heating in a bomb for 48 hours at a temperature of 70° C. and under a pressure of 300 pounds of oxygen per square inch. A comparison between the aged and unaged vulcanized rubber product is shown in Table III.

Table III

| Time of cure | Hours aged | Modulus of elasticity in lbs/in.² at elongation of | | | Tensile at break in lbs/in.² | Ultimate elongation % |
|---|---|---|---|---|---|---|
| | | 300% | 500% | 700% | | |
| 30 min. at 287° F | 0 | 224 | 506 | 2000 | 3158 | 785 |
| 30 min. at 287° F | 48 | 183 | 423 | 1540 | 1895 | 740 |
| 45 min. at 287° F | 0 | 246 | 604 | 2870 | 3548 | 740 |
| 45 min. at 287° F | 48 | 231 | 668 | | 2080 | 690 |

It is thus shown that the preferred class of anti-oxidants possesses remarkable age resisting properties, as the rubber stock described above wherein the reaction product of substantially equi-molecular proportions of benzylidene-aniline and beta naphthol was incorporated prior to vulcanization retained to a remarkable extent its original tensile characteristics, even after the severe test of 48 hours aging in an oxygen bomb.

Other Schiff's bases than those hereinbefore described for example anhydro formaldehyde aniline, methylene di-anilide, heptaldehyde aniline, heptaldehyde di-anilide, butyl aldehyde aniline, butyl aldehyde di-anilide, ethylidene aniline, ethylidene dianilide and the like may be reacted with phenol, alpha and beta naphthol and analogous compounds to form other anti-oxidants within the scope of the invention.

By the term a phenol as employed in the present specification is meant an aromatic hydrocarbon, wherein one or more hydrogen atoms in the benzene nuclei are substituted by hydroxyl groups only.

In all the examples hereinbefore cited, diphenyl-guanidine was used as an accelerator since it is known to produce a vulcanized rubber stock that has notoriously bad aging qualities.

The various examples hereinbefore set forth in detail are to be understood as illustrative only and not at all limitative of the scope of the invention. Other compounding ingredients including accelerators and other proportions of ingredients than those indicated in the various examples may be employed in the manufacture of various types of vulcanized rubber products as is well known to those skilled in the art to which the invention pertains. The invention is to be understood as limited solely by the claims attached hereto as a part of this specification wherein the invention is claimed as broadly as is possible in view of the prior art.

What is claimed is:

1. The process of manufacturing an age resisting vulcanized rubber product which comprises curing a rubber composition of vulcanization characteristics in the presence of an anti-oxidant comprising a reaction product of a mono-hydric phenol and a Schiff's base.

2. The process of manufacturing an age resisting vulcanized rubber product which comprises curing a rubber composition of vulcanization characteristics in the presence of an anti-oxidant comprising a reaction product of a phenol and a Schiff's base.

3. The process of manufacturing an age resisting vulcanized rubber product which comprises curing a rubber composition of vulcanization characteristics in the presence of an anti-oxidant comprising a reaction product of a mono-hydric naphthol and a Schiff's base.

4. The process of manufacturing an age resisting vulcanized rubber product which comprises curing a rubber composition of vulcanization characteristics in the presence of an anti-oxidant comprising a reaction product of beta naphthol and a Schiff's base.

5. The process of manufacturing an age resisting vulcanized rubber product which comprises curing a rubber composition of vulcanization characteristics in the presence of an anti-oxidant comprising a reaction product of substantially equi-molecular proportions of a mono-hydric phenol and a product formed by reacting substantially equi-molecular proportions of an aldehyde and an aromatic amine.

6. The process of manufacturing an age resisting vulcanized rubber product which comprises curing a rubber composition of vulcanization characteristics in the presence of an anti-oxidant comprising a reaction product of substantially equi-molecular proportions of a mono-hydric phenol and a product formed by reacting substantially equi-molecular proportions of an aldehyde containing at least one but less than 8 carbon atoms and an aromatic primary amine.

7. The process of manufacturing an age resisting vulcanized rubber product which comprises curing a rubber composition of vulcanization characteristics in the presence of an anti-oxidant comprising a reaction product of substantially equi-molecular proportions of a mono-hydric naphthol and a product formed by reacting substantially equi-molecular proportions of benzaldehyde and aniline.

8. The process of manufacturing an age resisting vulcanized rubber product which comprises curing a rubber composition of vulcanization characteristics in the presence of an anti-oxidant comprising a reaction product of substantially equi-molecular proportions of beta naphthol and benzylidene-aniline.

9. A vulcanized rubber product possessing age resisting characteristics comprising the vulcanization product of a rubber stock containing prior to the vulcanization of said stock an anti-oxidant comprising a reaction product of a mono-hydric phenol and a Schiff's base.

10. A vulcanized rubber product possessing age resisting characteristics comprising the vulcanization product of a rubber stock containing prior to the vulcanization of said stock an anti-oxidant comprising a reaction product of a phenol and a Schiff's base.

11. A vulcanized rubber product possessing age resisting characteristics comprising the vulcanization product of a rubber stock containing prior to the vulcanization of said stock an anti-oxidant comprising a reaction product of a mono-hydric naphthol and a Schiff's base.

12. A vulcanized rubber product possessing age resisting characteristics comprising the vulcanization product of a rubber stock containing prior to the vulcanization of said stock an anti-oxidant comprising a reaction product of beta naphthol and a Schiff's base.

13. A vulcanized rubber product possessing age resisting characteristics comprising the vulcanization product of a rubber stock containing prior to the vulcanization of said stock an anti-oxidant comprising a reaction product of substantially equi-molecular proportions of a mono-hydric phenol and a product formed by reacting substantially equi-molecular proportions of an aldehyde and an aromatic amine.

14. A vulcanized rubber product possessing age resisting characteristics comprising the vulcanization product of a rubber stock containing prior to the vulcanization of said stock an anti-oxidant comprising a reaction product of substantially equi-molecular proportions of a mono-hydric phenol and a product formed by reacting substantially equi-molecular proportions of an aldehyde containing at least one but less than eight carbon atoms and an aromatic primary amine.

15. A vulcanized rubber product possessing age resisting characteristics comprising the vulcanization product of a rubber stock containing prior to the vulcanization of said stock an anti-oxidant comprising a reaction product of substantially equi-molecular proportions of a mono-hydric naphthol and a product formed by reacting substantially equi-molecular proportions of benzaldehyde and aniline.

16. A vulcanized rubber product possessing age resisting characteristics comprising the vulcanization product of a rubber stock containing prior to the vulcanization of said stock an anti-oxidant comprising a reaction product of substantially equi-molecular proportions of beta naphthol and benzylideneaniline.

17. The process of manufacturing an age resisting vulcanized rubber product which comprises curing a rubber composition of vulcanization characteristics in the presence of an anti-oxidant comprising a reaction product of substantially equi-molecular proportions of a phenol and a product formed by reacting substantially equi-molecular proportions of an aldehyde containing at least one but less than eight carbon atoms and aniline.

18. A vulcanized rubber product possessing age resisting characteristics comprising the vulcanization product of a rubber stock containing prior to the vulcanization of said stock an anti-oxidant comprising a reaction product of substantially equi-molecular proportions of a phenol and a product formed by reacting substantially equi-molecular proportions of an aldehyde containing at least one but less than eight carbon atoms and aniline.

19. The process of manufacturing an age resisting vulcanized rubber product which comprises curing a rubber composition of vulcanization characteristics in the presence of an anti-oxidant comprising a reaction product of one member of a group consisting in phenol, alpha naphthol and beta naphthol, and a Schiff's base.

20. A vulcanized rubber product possessing age resisting characteristics comprising the vulcanized product of a rubber stock containing prior to the vulcanization of said stock an anti-oxidant comprising a reaction product of one member of a group consisting in phenol, alpha naphthol and beta naphthol, and a Schiff's base.

In testimony whereof I hereunto affix my signature.

WINFIELD SCOTT.